United States Patent
Yokomatsu et al.

(10) Patent No.: US 12,204,397 B2
(45) Date of Patent: Jan. 21, 2025

(54) FAULT DIAGNOSIS APPARATUS, NON-TRANSITORY COMPUTER-READABLE RECORDING MEDIUM, AND FAULT DIAGNOSIS METHOD

(71) Applicant: Yokogawa Electric Corporation, Tokyo (JP)

(72) Inventors: Kota Yokomatsu, Tokyo (JP); Yusaku Kawachi, Tokyo (JP); Akiyoshi Yada, Tokyo (JP); Kosuke Tsumura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 55 days.

(21) Appl. No.: 18/126,184

(22) Filed: Mar. 24, 2023

(65) Prior Publication Data

US 2023/0315559 A1    Oct. 5, 2023

(30) Foreign Application Priority Data

Mar. 30, 2022   (JP) .................................. 2022-057378

(51) Int. Cl.
*G06F 11/07*   (2006.01)
(52) U.S. Cl.
CPC ........ *G06F 11/079* (2013.01); *G06F 11/0769* (2013.01)
(58) Field of Classification Search
CPC .............................. G06F 11/079; G06F 11/0769
See application file for complete search history.

(56) References Cited

U.S. PATENT DOCUMENTS

| | | | |
|---|---|---|---|
| 5,214,577 A | 5/1993 | Sztipanovits et al. | |
| 2010/0164717 A1* | 7/2010 | Hammer | G05B 19/0425 340/540 |
| 2017/0261972 A1* | 9/2017 | Vaissiere | G05B 23/0256 |
| 2019/0079506 A1* | 3/2019 | Hubauer | G05B 23/0208 |

FOREIGN PATENT DOCUMENTS

| | | |
|---|---|---|
| CN | 110907812 A | 3/2020 |
| JP | H06066685 A | 3/1994 |
| JP | H08-221118 A | 8/1996 |
| JP | 2013-242919 A | 12/2013 |
| JP | 2017-99132 A | 6/2017 |
| JP | 2018-128855 A | 8/2018 |

OTHER PUBLICATIONS

Extended European Search Report issued in corresponding European Patent Application No. 23163315.7, dated Sep. 1, 2023, 7 pages.
Notice of Reasons for Refusal issued in corresponding Japanese Application No. 2022-057378 mailed Feb. 20, 2024 (7 pages).
Notice of Reasons for Refusal issued in corresponding Japanese Patent Application No. 2022-057378, dated Jul. 9, 2024 (8 pages).

* cited by examiner

*Primary Examiner* — Nadeem Iqbal
(74) *Attorney, Agent, or Firm* — Osha Bergman Watanabe & Burton LLP

(57) ABSTRACT

A fault diagnosis apparatus for diagnosing a fault in a field device in a facility, includes: a processor that: acquires, from the field device, an alarm or a current output that represents abnormality in the field device; upon detecting first fault cause information corresponding to the alarm or to the current output in fault diagnosis information, specifies the first fault cause information as a cause of the fault in the field device; and notifies a user of the specified first fault cause information.

8 Claims, 3 Drawing Sheets

| ALARM OR CURRENT OUTPUT | PARAMETER | ABNORMAL OPERATION | FAULT CAUSE |
|---|---|---|---|
| A1 | B1 | C1 | D1 |
| A2 | B2 | C2 | D2 |

FAULT DIAGNOSIS APPARATUS, NON-TRANSITORY COMPUTER-READABLE RECORDING MEDIUM, AND FAULT DIAGNOSIS METHOD

CROSS-REFERENCE TO RELATED APPLICATION

The present application claims priority to Japanese Patent Application No. 2022-057378 filed in Japan on Mar. 30, 2022. The contents of this application are incorporated herein by reference in their entirety.

BACKGROUND

Technical Field

The present disclosure relates to a fault diagnosis apparatus, a non-transitory computer-readable recording medium, and a fault diagnosis method.

Description of the Related Art

In a facility including various types of plants, various types of field devices, such as flowmeters, temperature sensors, valves and heaters, are used. In recent years, field devices capable of accurately performing flow computation in a plant, or the like, have been known, too (for example, refer to Japanese Laid-open Patent Publication No. 2013-242919).

The above-described field devices are capable of accurately performing flow computation, however, are incapable of notifying users of the causes of faults of the field devices.

SUMMARY

One or more embodiments provide a technological improvement over conventional technologies. In particular, a fault diagnosis apparatus, a non-transitory computer-readable recording medium, and a fault diagnosis method according to one or more embodiments may be able to notify a user of a cause of a fault of a field device that is provided in a facility including a plant.

This provides a practical, technological improvement over conventional technologies that would be readily appreciated by those skilled in the art.

Further details regarding the various improvements and advantages will become apparent from the descriptions that follow.

According to one or more embodiments, a fault diagnosis apparatus includes, an acquisition unit (a processor) configured to acquire an alarm representing abnormality in a field device that is provided in a facility or a current output representing abnormality in the field device from the field device, a specifying unit (the processor) configured to, when detecting fault cause information (first fault cause information) corresponding to the alarm or the current output in fault diagnosis information on a diagnosis on a fault of the field device, specify the fault cause information as a cause of the fault of the field device, and a notifying unit (the processor) configured to notify a user of the fault cause information that is specified by the specifying unit.

According to one or more embodiments, a non-transitory computer-readable recording medium having stored therein a fault diagnosis program (fault diagnosis instructions) that causes a computer to execute a process includes, acquiring an alarm representing abnormality in a field device that is provided in a facility or a current output representing abnormality in the field device from the field device, when detecting fault cause information corresponding to the alarm or the current output in fault diagnosis information on a diagnosis on a fault of the field device, specifying the fault cause information as a cause of the fault of the field device, and notifying a user of the fault cause information that is specified.

A fault diagnosis method includes, acquiring an alarm representing abnormality in a field device that is provided in a facility or a current output representing abnormality in the field device from the field device, when detecting fault cause information corresponding to the alarm or the current output in fault diagnosis information on a diagnosis on a fault of the field device, specifying the fault cause information as a cause of the fault of the field device, and notifying a user of the fault cause information that is specified.

DESCRIPTION OF THE EMBODIMENTS

Figure 1:
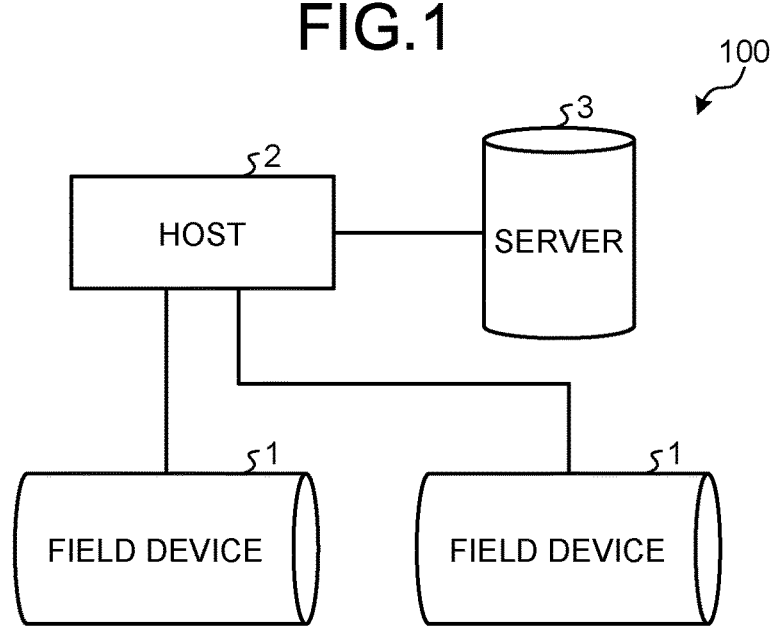
FIG. 1 is a diagram illustrating an example of a schematic configuration of a fault diagnosis apparatus according to one or more embodiments.

One or more embodiments will be described below with reference to the accompanying drawings. The same components are denoted with the same reference numerals and redundant description will be omitted as appropriate.

FIG. 1 is a diagram illustrating an example of a schematic configuration of a fault diagnosis apparatus according to one or more embodiments. A control system 100 is a control system that is used to control a plant, or the like. The control system 100 includes a plurality of field devices 1, a host 2 and a server 3. Plants include, for example, chemical plants. Facilities other than plants include air conditioning facilities of buildings.

The field device 1 is provided in various sites in facilities including a plant. The field device 1 is configured to be able to communicate with other field devices 1, the host 2, and the server 3 by any one or both of wireless communication and wired communication, or the like. The field device 1 outputs an alarm, a current output, various types of parameters, etc., to the host 2. The sites of arrangement of the host 2 and the server 3 are not limited to those in the plant.

The field devices 1 are, for example, a sensor device, such as a pressure sensor, a temperature sensor, a flow sensor, a pH sensor, a speed sensor or an acceleration sensor, an operation device, such as a valve, a pump or a fan, and an alarm device, such as a lamp or a speaker. The field devices 1 are not limited to them. The field devices 1 may be devices that are provided in other various facilities. The number of devices of the field devices 1 that the control system 100 includes is not particularly limited.

Figure 2:
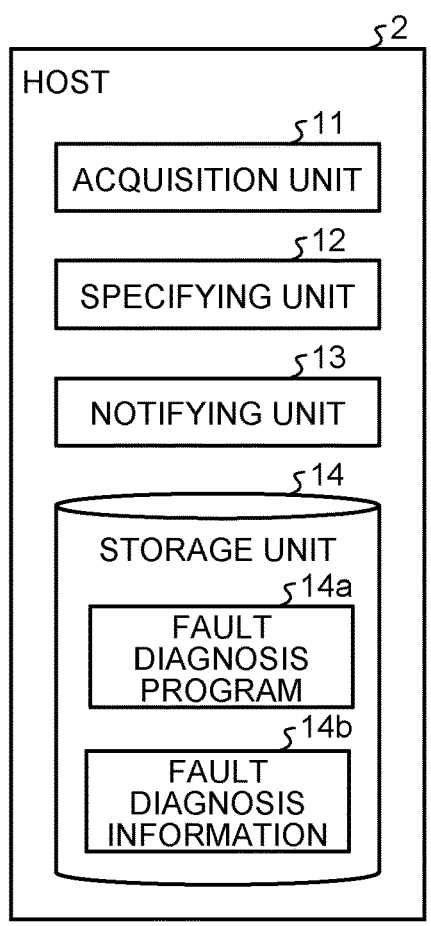
FIG. 2 is a diagram illustrating an example of a host according to one or more embodiments.

FIG. 2 is a diagram illustrating an example of the host. The host 2 includes an acquisition unit 11, a specifying unit 12, a notifying unit 13, and a storage unit 14.

The acquisition unit 11 acquires an alarm representing abnormality in the field device 1 or a current output representing abnormality in the field device 1 from the field device 1. For example, the current output representing abnormality is a current value out of a range of current output values representing normality. The acquisition unit 11 is also able to acquire a parameter corresponding to the alarm or the current output or an abnormal operation corresponding to the alarm or the current output from the field device 1.

Upon detecting fault cause information corresponding to the alarm or the current output in fault diagnosis information 14b on fault diagnosis on the field device 1, the specifying unit 12 specifies the fault cause information as the cause of a fault of the field device 1. Upon detecting fault cause information corresponding to the alarm or the current output and the parameter in the fault diagnosis information 14b, the specifying unit 12 may specify the fault cause information as the cause of a fault of the field device 1.

The notifying unit 13 notifies a user of the fault cause information that is specified by the specifying unit 12. When the specifying unit 12 is unable to specify the cause of the fault, the notifying unit 13 notifies the user of the fact that it is not possible to specify the cause of the fault as the fault cause information.

The storage unit 14 stores various types of data and various sets of information necessary for processes executed by the host 2 and is realized using, for example, a memory, a hard disk, or the like. FIG. 2 exemplifies a fault diagnosis program (fault diagnosis instructions) 14a and the fault diagnosis information 14b as an example of information that is stored in the storage unit 14.

The fault diagnosis program 14a is a program (software) that causes a computer to execute the process performed by the host 2.

The fault diagnosis information 14b is generated, for example, by a fault injection test (FIT) in safety integrity level (SIL) evaluation. The fault injection test is a test in which the alarm or the current output and the various types of parameters that the field device 1 outputs when a fault is caused in specific parts forming the field device 1 are measured. For example, when a resistor forming the field device 1 is short-circuited, the field device 1 outputs the alarm or the current output that represents abnormality in a sensor detection value. The current output that the field device 1 outputs represents the abnormality and, in association with a change in the value of the parameter related to the sensor detection value, represents the abnormal operation in which the sensor detection value is abnormal, that is, for example, exceeds a given range. The alarm or the current output, the parameter, and the abnormal operation and the short circuit of the resistor serving as the cause of the fault of the field device 1 are associated with each other and are stored as the fault diagnosis information 14b in the storage unit 14. As a result, when the acquisition unit 11 acquires the alarm or the current output that is associated with the short circuit of the resistor, the specifying unit 12 is able to specify that the cause of the fault is a short circuit of the resistor from the alarm or the current output. Tests similar to the fault injection test are sometimes also applicable to tests according to other safety standards.

Figures 3, 4:
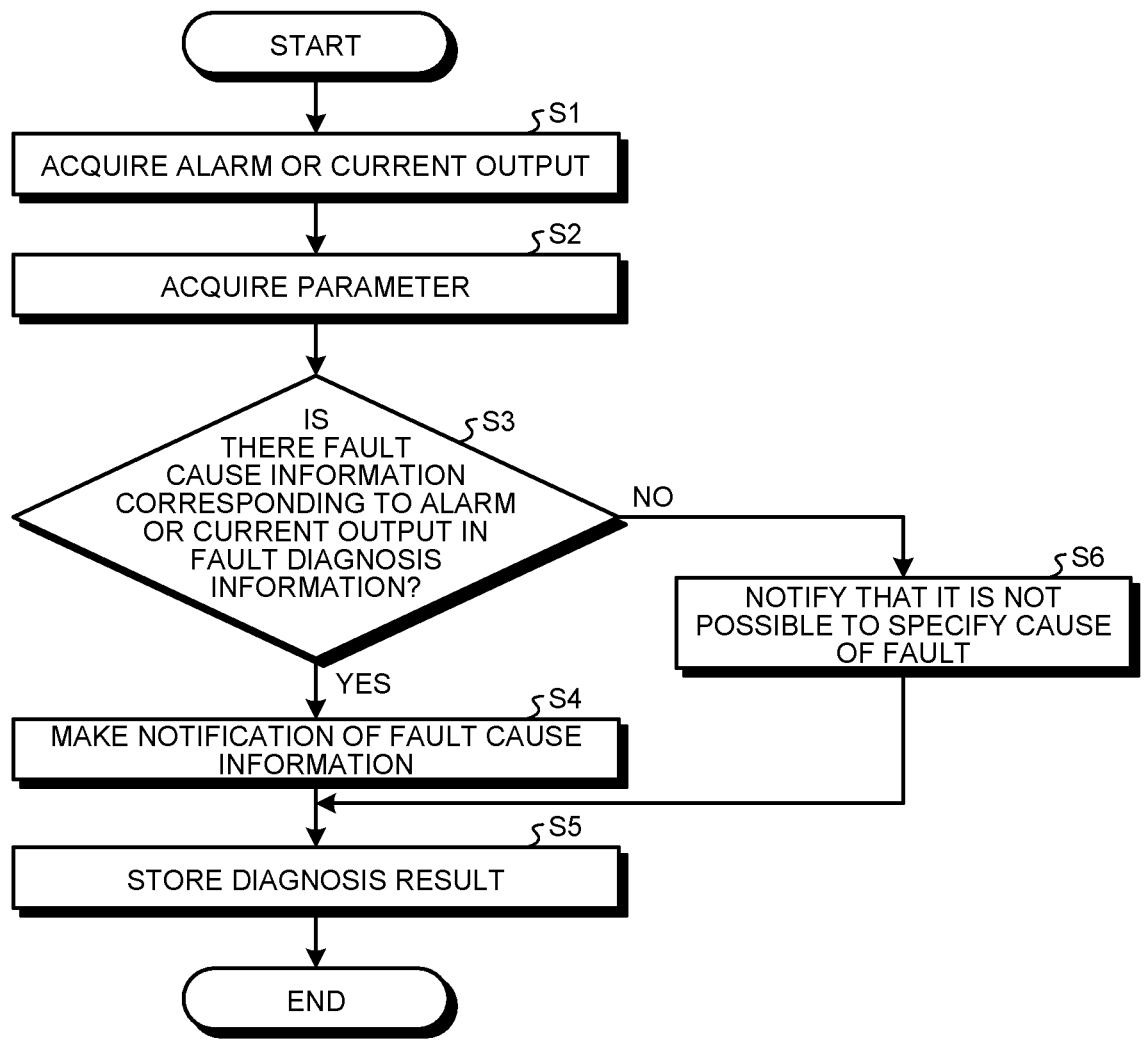
FIG. 3 is a diagram illustrating an example of fault diagnosis information according to one or more embodiments.
FIG. 4 is a flowchart illustrating an example of operations of the fault diagnosis apparatus according to one or more embodiments.

FIG. 3 is a diagram illustrating an example of the fault diagnosis information. The fault diagnosis information 14b includes, for example, an alarm or current outputs A1 and A2, parameters B1 and B2, abnormal operations C1 and C2, and fault causes D1 and D2. Description will be given using the above-described exemplary fault injection test. The alarm or the current output representing abnormality in the voltage value in the case where a part Rxxxx of the field device 1 is short-circuited corresponds to "ALARM OR CURRENT OUTPUT A1", the voltage value that the field device 1 outputs at that time corresponds to "PARAMETER B1", the abnormal operation, such as one in which the voltage value at that time exceeds the given range, corresponds to "ABNORMAL OPERATION C1", and the short circuit of the part Rxxxx at that time corresponds to "FAULT CAUSE D1". In this example, when the acquisition unit 11 acquires the alarm or the current output A1, the specifying unit 12 specifies that the cause of the fault is the fault cause D1 based on the fault diagnosis information 14b because the alarm or the current output A1 and the fault cause D1 correspond to each other and the notifying unit 13 makes a notification of the fault cause D1 as the fault cause information. Specifically, the notifying unit 13 notifies the user of the fact that the short circuit of the part Rxxxx corresponding to the fault cause D1 is the cause of the fault. On the other hand, when the acquisition unit 11 acquires an alarm or a current output A3 that is not in the fault diagnosis information 14b different from the alarm or the current outputs A1 and A2, the specifying unit 12 determines that it is not possible to specify the cause of the fault based on the fault diagnosis information 14b and the notifying unit 13 makes a notification indicating that it is not possible to specify the cause of the fault. Note that the specifying unit 12 may specify the cause of the fault using only the alarm or the current output or the cause of the fault may be specified using at least one of or a combination of at least two of the alarm or the current output, the parameter, and the abnormal operation.

The fault diagnosis information 14b may contain the cause of the fault that an operator, such as a manager of the plant, specifies when the field device 1 has the fault. When there is not the information corresponding to the alarm or the current output in the result of the fault injection test, the operator specifies the cause of the fault and stores the cause of the fault in association with the alarm or the current output in the storage unit 14 as the fault diagnosis information 14b. As a result, when the acquisition unit 11 acquires the alarm or the current output again, the specifying unit 12 is able to specify the cause of the fault.

The fault diagnosis information 14b may contain information on an environment in which the field device 1 is set or information on an operating time in which the field device 1 is in operation.

When, for example, information that indicates that the environment in which the field device 1 is set is an environment in which vibrations are added, serving as information on the environment in which the field device 1 is set, is stored in the storage unit 14 as the fault diagnosis information 14b, the specifying unit 12 may preferentially specify a fault of a part that tends to have a fault because of vibrations as the cause of the fault. Specifically, a setting environment "ENVIRONMENT IN WHICH VIBRATIONS ARE ADDED" is stored as the fault diagnosis information 14b and it is assumed that the alarm or a current output A11 is acquired. Two fault causes D11 and D12 correspond to the alarm or the current output A11. The fault cause D11 corresponds to a fault of a part RA that tends to have a fault because of vibrations and the fault cause D12 corresponds to a fault of a part RB in which there is no correlation between vibrations and a fault. In this case, the specifying unit 12 may preferentially specify the fault of the part RA corresponding to the fault cause D11 as the cause of the fault from the alarm or the current output A11 that is acquired from the field device 1 and information on the setting environment "ENVIRONMENT IN WHICH VIBRATIONS ARE ADDED".

When information on the operating time in which the field device 1 is in operation is stored as the fault diagnosis information 14b in the storage unit 14, the specifying unit 12 may specify the cause of the fault based on the relationship between the operating time and the durable life of parts. Specifically, assume that information indicating that the durable life of a part RC is three years and the durable life of a part RD is ten years is stored as the fault diagnosis information 14b and an alarm or a current output A21 is acquired. Two fault causes D21 and D22 correspond to the alarm or the current output A21. The fault cause D21 corresponds to a fault of the part RC and the fault cause D22 corresponds to a fault of the part RD. In this case, the specifying unit 12 may preferentially specify the fault cause D21 corresponding to a fault of the part RC as the cause of the fault when the operating time is at least three years and less than 10 years according to the information on the operating time of the device that is acquired from the field device 1. In a similar situation, when the operating time is at least 10 years, the specifying unit 12 may specify that the cause of the fault is the fault cause D21 or D22 and the notifying unit 13 may notify the user that the cause of the fault is the fault cause D21 or D22.

The fault diagnosis information 14b is not limited to the result of the fault injection test, and the fault diagnosis information 14b may include the result of various types of verification work, such as the result of a verification work on software under development or the result of a single fault test. When the fault diagnosis information 14b contains the result of various types of verification work, determining whether the alarm or the current output that is output in the various types of verification work serving as the result of various types of verification work and the alarm or the current output that is output by the field device 1 correspond to each other enables the specifying unit 12 to specify the cause of the fault.

A process (fault diagnosis method) that the host 2 executes will be described next. FIG. 4 is a flowchart illustrating an example of operations of the fault diagnosis apparatus. First of all, the acquisition unit 11 acquires an alarm or a current output from the field device 1 (step S1).

The acquisition unit 11 further acquires a parameter corresponding to the alarm or the current output from the field device 1 (step S2).

The specifying unit 12 determines whether there is information (first fault cause information) corresponding to the alarm or the current output in the fault diagnosis information 14b (step S3). The specifying unit 12 may determine whether there is information (second fault cause information) corresponding to the alarm or the current output and the parameter in the fault diagnosis information 14b.

When the specifying unit 12 determines that there is information corresponding to the alarm or the current output in the fault diagnosis information 14b (YES at step S3), the specifying unit 12 specifies the cause of the fault that is associated with the information as the cause of the fault of the field device 1.

The notifying unit 13 notifies a user of fault cause information containing the cause of the fault that is specified by the specifying unit 12 (step S4). The notifying unit 13 notifies the user of the fault cause information by causing a display device that an operator monitors to display a message of a notification indicating the cause of the fault.

The storage unit 14 further stores a diagnosis result (step S5).

At step S3, when the specifying unit 12 determines that there is not the information corresponding to the alarm or the current output in the fault diagnosis information 14b (NO at step S3), the specifying unit 12 determines that it is not possible to specify the cause of the fault.

The notifying unit 13 notifies the user of the fact that it is not possible to specify the cause of the fault as the fault cause information (step S6). The notifying unit 13, for example, causes the display device that the operator monitors to display a message notifying that it is not possible to specify the cause of the fault.

Thereafter, the storage unit 14 stores the diagnosis result (step S5). The operator may specify the cause of the fault and store the cause of the fault in association with the alarm or the current output as the fault diagnosis information 14b via a unit that performs writing in the storage unit 14 (not illustrated in the drawings). Updating the fault diagnosis information 14b enables the specifying unit 12 to specify the cause of the fault when the acquisition unit 11 acquires the alarm or the current output. As a result, the control system 100 is caused to operate and accordingly the fault diagnosis information 14b is accumulated, which makes it possible to increase accuracy in specifying the cause of the fault.

Figure 5:
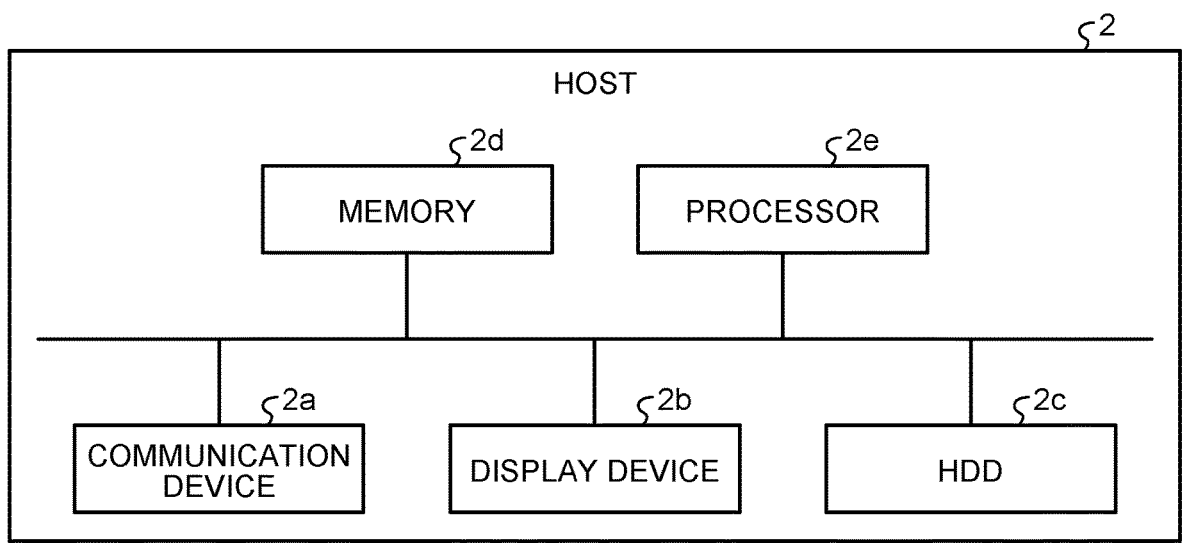
FIG. 5 is a diagram illustrating an example of a hardware configuration of the host according to one or more embodiments.

FIG. 5 is a diagram illustrating an example of a hardware configuration of the host. A computer that has the exemplified hardware configuration, or the like, functions as the host 2 described above. In this example, the host 2 includes a communication device 2a, a display device 2b, a hard disk drive (HDD) 2c, a memory 2d, and a processor 2e.

The communication device 2a is a network interface card, or the like, and enables communication with another device. The display device 2b is, for example, a touch panel or a display. The HDD 2c functions as the storage unit 14 and stores, for example, the fault diagnosis program 14a.

The processor 2e reads the fault diagnosis program 14a from the HDD 2c, or the like, and loads the fault diagnosis program 14a in the memory 2d, thereby causing the computer as the host 2. The functions include the function of the acquisition unit 11, the function of the specifying unit 12, and the function of the notifying unit 13 described above.

The fault diagnosis program 14a is distributable via a network, such as the Internet. The fault diagnosis program 14a is recorded in a computer-readable recording medium, such as a hard disk, a flexible disk (FD), a CD-ROM, a magneto-optical disk (MO) or a digital versatile disk (DVD), is read by the computer from the recording medium, and thus is executable.

Devices other than the host 2, for example, the field device 1, the server 3, etc., may have the same hardware configuration as that described above.

In the above-described embodiments, the example where the host 2 includes the acquisition unit 11, the specifying unit 12, the notifying unit 13 and the storage unit 14 is described. Alternatively, the field device 1 or the server 3 may include the acquisition unit, the specifying unit, the notifying unit, and the storage unit.

According to one or more embodiments described above, because the user is notified of the cause of the fault that is specified by the specifying unit 12 based on the fault diagnosis information 14b, the host 2 is able to notify the user of the cause of the fault in the field device 1.

The specifying unit 12 may specify the cause of the fault of the field device 1 using a fault cause diagnosis model that is generated by machine learning in which at least one of the alarm or the current output, the parameter, and the abnormal operation of the fault diagnosis information 14b is an explanatory variable and the cause of the fault is a response variable. In this case, the specifying unit 12 inputs at least one of the alarm or the current output, the parameter, and the abnormal operation that are acquired from the field device 1 to the fault cause diagnosis model as input data and specifies the cause of the fault using the output result of the fault cause diagnosis model. Accordingly, the host 2 is able to increase accuracy in specifying the cause of the fault. The specifying unit 12 is able to acquire likelihood (probability) of each cause of fault from the alarm or the current output and the parameter from the output result of the fault cause diagnosis model, and thus the user may be notified of a cause of the fault whose likelihood is at or above a threshold. When there are a plurality of causes of the fault, the specifying unit 12 may notify the user of the causes of the fault and likelihood thereof. A neural network, or the like, can be employed for the fault cause diagnosis model.

Technological Improvements

According to the disclosure, it is possible to realize a fault diagnosis apparatus capable of notifying a user of the cause of a fault of a field device that is provided in facilities including a plant, a computer-readable recording medium, and a fault diagnosis method.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A fault diagnosis apparatus for diagnosing a fault in a field device in a facility, comprising:
  a storage that stores fault diagnosis information containing:
    fault causes;
    current outputs that are each associated with one or more corresponding fault causes of the fault causes; and
    environment information indicating correlation between a part of the field device and an environment in which the field device is disposed; and
  a processor that:
    acquires, from the field device, a current output that represents abnormality in the field device,
    upon detecting two or more of the fault causes corresponding to the acquired current output in the stored fault diagnosis information, specifies one of the two or more fault causes caused by the environment as a cause of the fault in the field device based on the environment information, and
    notifies a user of the specified one of the two or more fault causes.

2. The fault diagnosis apparatus according to claim 1, wherein the processor further:
  acquires a parameter corresponding to the acquired current output; and
  upon detecting one of the fault causes corresponding to the acquired current output and the parameter in the fault diagnosis information, specifies the detected one of the fault causes as the cause of the fault in the field device.

3. The fault diagnosis apparatus according to claim 1, wherein the fault diagnosis information further contains a result of a fault injection test on the field device.

4. The fault diagnosis apparatus according to claim 1, wherein the fault diagnosis information further contains a cause of a fault specified by an operator.

5. The fault diagnosis apparatus according to claim 1, wherein the fault diagnosis information further contains information on an operating time in which the field device is in operation.

6. The fault diagnosis apparatus according to claim 1, wherein the processor further specifies the cause of the fault of the field device using a fault cause diagnosis model that represents the fault diagnosis information and is generated by machine learning in which the acquired current output is input data and the specified one of the two or more fault causes is output data.

7. A non-transitory computer-readable recording medium having stored therein fault diagnosis instructions for diagnosing a fault in a field device in a facility that cause a computer to execute a process comprising:
  in a storage, storing fault diagnosis information containing:
    fault causes;
    current outputs that are each associated with one or more corresponding fault causes of the fault causes; and
    environment information indicating correlation between a part of the field device and an environment in which the field device is disposed;
  acquiring, from the field device, a current output that represents abnormality in the field device;
  upon detecting two or more fault causes of the fault causes corresponding to the acquired current output in the fault diagnosis information stored in the storage, specifying one of the two or more fault causes caused by the environment as a cause of the fault in the field device based on the environment information; and
  notifying a user of the specified one of the two or more fault causes.

8. A fault diagnosis method for diagnosing a fault in a field device in a facility, comprising:
  in a storage, storing fault diagnosis information containing:
    fault causes;
    current outputs that are each associated with one or more corresponding fault causes of the fault causes; and
    environment information indicating correlation between a part of the field device and an environment in which the field device is disposed;
  acquiring, from the field device, a current output that represents abnormality in the field device;
  upon detecting two or more fault causes of the fault causes corresponding to the acquired current output in the fault diagnosis information stored in the storage, specifying one of the two or more fault causes caused by the environment as a cause of the fault in the field device based on the environment information; and
  notifying a user of the specified one of the two or more fault causes.

* * * * *